United States Patent [19]
Clarke

[11] Patent Number: 6,038,711
[45] Date of Patent: Mar. 21, 2000

[54] POTTY TRAINING DEVICE

[76] Inventor: William A. Clarke, 4549 Budd Dr., Erie, Pa. 16506

[21] Appl. No.: 09/287,778

[22] Filed: Apr. 7, 1999

[51] Int. Cl.[7] .................................................. A47K 11/02
[52] U.S. Cl. ..................................................... 4/449; 4/902
[58] Field of Search ............................... 4/449, 479, 483, 4/902

[56] References Cited

U.S. PATENT DOCUMENTS

| | | | |
|---|---|---|---|
| D. 292,019 | 9/1987 | Hall ........................................... | 4/242.1 |
| 3,364,478 | 1/1968 | Dee Waard ................................. | 4/483 |
| 4,407,024 | 10/1983 | Schneider ................................. | 4/242.1 |
| 5,369,820 | 12/1994 | Blount ........................................ | 4/483 |
| 5,573,407 | 11/1996 | Dunford ..................................... | 4/902 |
| 5,652,975 | 8/1997 | Hoskin ....................................... | 4/902 |
| 5,781,939 | 7/1998 | Bledsoe ..................................... | 4/483 |
| 5,829,073 | 11/1998 | Lee ............................................. | 4/902 |

*Primary Examiner*—David J. Walczak
*Attorney, Agent, or Firm*—Richard K. Thomson

[57] ABSTRACT

A potty chair resembling a miniature toilet uses features of appearance and a handle for producing a simulated flushing sound, to attract a toddler, familiarize her/him with the device and remove barriers to its usage. A dual phase reward system including a displayable trophy and a storage cubby hole for prizes such as candy, stickers, and toys, encourage the child to use the device and accelerate the completion of potty training.

19 Claims, 2 Drawing Sheets

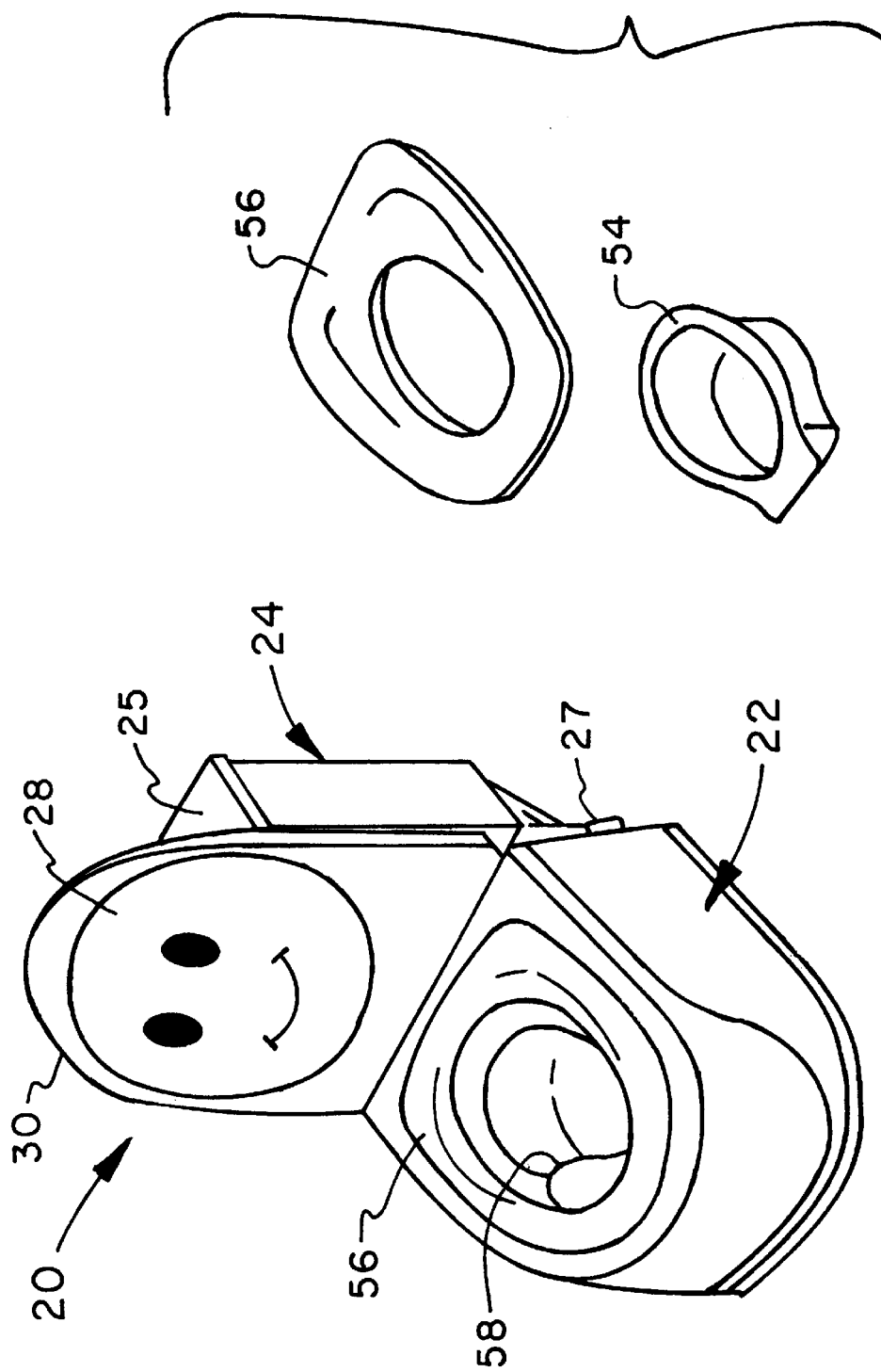

POTTY TRAINING DEVICE

BACKGROUND AND SUMMARY OF THE INVENTION

The present invention is directed to a device to facilitate potty training toddlers. More particularly, the present invention is directed to a potty chair that attracts the child, quickly familiarizes the child with the device and what it is for and, through a rewards system, leads to rapid training through positive reinforcement.

Many attempts have been made to produce a potty training device which will encourage a toddler to use the device resulting in the child becoming potty trained. To date, all such attempts have been futile.

For the most part, such potty training devices are little more than pails that are placed in the middle of the floor and require parents to encourage their children to "do their business" in the pail. A farmer would be as apt to meet with success by sliding a milk pail under "Bossy" and exhorting her to "do her business" in the pail.

Various electrical devices have been devised which produce some sound in response to a tinkle stream closing the circuit to provide a "reward" for the child's successful use of the device. While this may seem a reasonable approach to a parent desperate to potty train her/his child, such devices have produced little or no results with the children. Some kids fail to make the connection between the cause and effect. For others, the simultaneous production of sound with pottying is distracting and in some cases, distressing. This is to say nothing of the potential traumatization which might occur if, somehow, the device short circuited resulting in the child receiving an electrical shock. The child may conclude that she/he would prefer to wear diapers until age 20 rather than risk a possible reoccurrence of such an event.

The potty training device of the present invention is designed to draw a toddler to it, increase familiarity with it, breakdown and eliminate any barriers to its use and, finally, to provide a system for encouraging its repeated use hastening the toddler's successful completion of potty training. A further benefit of the present invention is that there is no electrical device to short circuit or malfunction which could traumatize the child.

The potty training device of the present invention looks like a miniature toilet. It has a self-standing stool or seat and an attached generally rectangular back member. This helps the toddler identify its function: her/his parents use the full-sized toilet and she/he is to use this down-sized version. In addition, the present invention is equipped with elements to draw the toddler to increase familiarity and remove the "scare factor".

First, the potty training device of the present invention has a flush handle which, when activated, produces the simulated sound of an actual toilet flushing. This feature draws the child to the device and helps her/him get accustomed to being around it. Second, the device has a number of decals which attract the child. These may take the form of fish or the like on the exterior portion of the "tank" or back portion as well as on the stool. In addition, on the underneath surface of the lid, a "smiley face" encourages the child to lift the lid and familiarize herself/himself with the collection receptacle. This will enable the child to become convinced that there is nothing in the receptacle that is going to "get her/him".

As an alternative to, or, in addition to, the decals on the exterior of the device, the generally rectangular tank member may be made entirely of clear plastic and plastic fish, stars or other items suspended inside the compartment. Such articles will produce curiosity which, in connection with the flusher, will draw the child and help break down the "fear factor".

Finally and, perhaps, most importantly, the potty training device of the present invention incorporates a two-phased reward system. Small children respond well to having their accomplishments rewarded and their achievements praised. The first phase of the reward system involves a storage compartment with a clear window so the child can see what is contained therein. Items in the compartment can include toys, stickers, candy, etc., which the child will receive for successful use of the device. As the training progresses, the child will associate the use of the potty chair with receiving one of the reward items in the compartment which will encourage the desired behavior.

The second phase comprises a displayable trophy which congratulates the child for successfully accomplishing proper use of the training device. A hook, or the like, can be mounted on the rear of the tank member to store the trophy when it is not being displayed. Velcro® fabric can be adhered to the top of the tank with a complementary strip affixed to the base of the trophy. Display of the trophy acknowledges the child's achievement and enables her/him to recount her/his accomplishment to siblings and parents as they arrive home. This positive reinforcement is beneficial to training the child "in the way she/he should go."

Various other features, advantages and characteristics of the present invention will become apparent to one of ordinary skill in the art after a reading of the following specification.

BRIEF DESCRIPTION OF THE DRAWINGS

The preferred embodiment(s) of the present invention are depicted in the Figures with like elements bearing like reference numerals and in which FIG. 1 is a front perspective view of a first embodiment of the potty training device of the present invention;

FIG. 4 is a front perspective view of components of the first embodiment of the present invention.

DETAILED DESCRIPTION OF PREFERRED EMBODIMENT(S)

Figure 3:
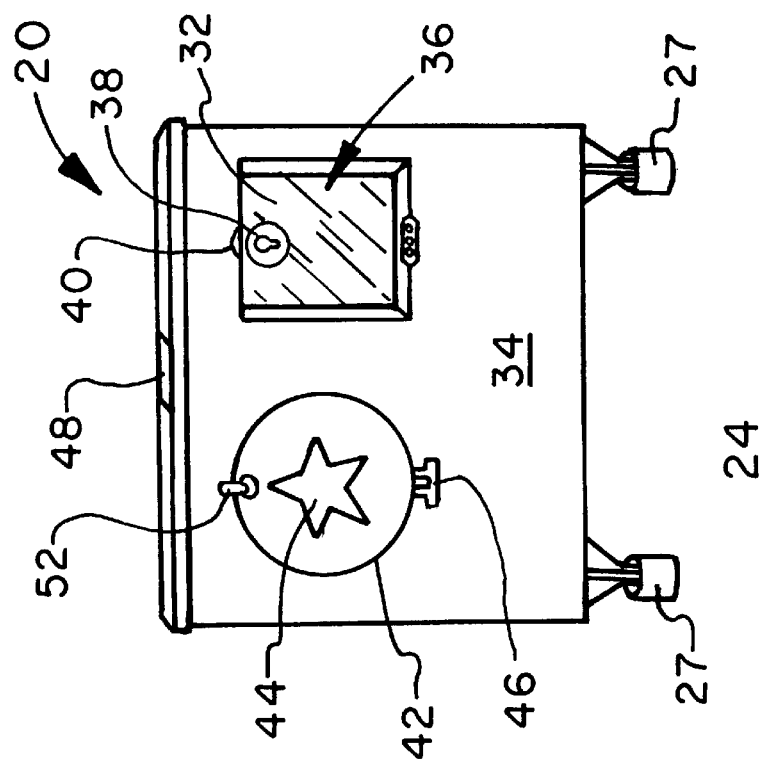
FIG. 3 is a back view of the first embodiment of the potty training device of the present invention.
Figure 2:
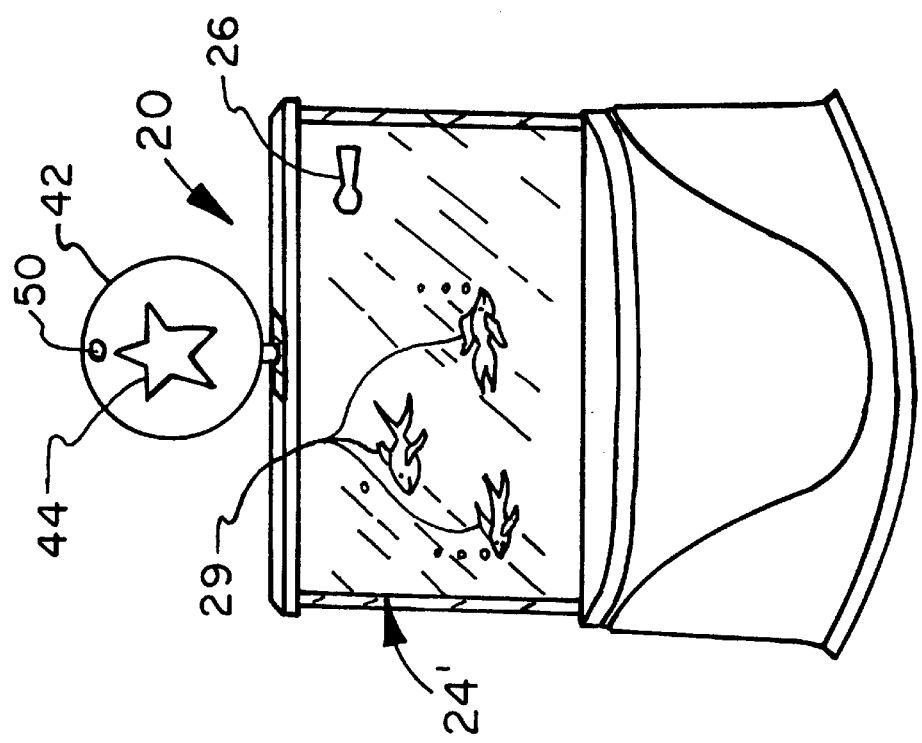
FIG. 2 is a front view of a second embodiment of the potty training device of the present invention.

A first embodiment of the potty training device of the present invention is shown in FIGS. 1–3 generally at 20. As best seen in FIG. 1, the device 20 of the present invention includes a free standing stool 22 and a generally rectangular attached back or tank member 24. It will be understood that it is intended that the term "attached" include both a back member 24 which is molded integrally with the stool 22 and one which is made separately and literally attached to the stool 22 using fasteners, adhesive or the like. This stool 22 with back member 24 give the appearance of being a miniature full-size toilet enabling the toddler to identify is usage. Training device 20 is made entirely of high durability plastic and portions may be made of colorful plastic to enhance the attractiveness to the child.

A pivotable handle 26 attached to back member 24 provides a simulated flushing sound when actuated by the toddler in an oscillatory motion which mimics that of a real toilet. A suitable sound producing microchip circuit is available from A.G.C., 329 Old Courthouse Road, New Hyde Park, N.Y. 11040 who markets novelty noise makers. Decals may adorn the exterior portion of the potty training device to provide a softening of its features so as to attract the toddler. These decals can include a large "smiley face" 28 beneath the openable/closable lid 30 which encourage the child to open the lid 30 and investigate the internals of the potty training device 20. This will help de-demonize the training device 20 and breakdown any barriers to its usage. A pair of legs 27 on back member 24 provide additional stability and prevent tipping.

In a second embodiment depicted in FIG. 2, back member 24' is made entirely of clear, see-through plastic. Items such as fish 29 can be suspended within the tank as an additional means to intrigue and attract the toddler. These items 29 can be in addition to or in lieu of decals displayed on the outside of device 20.

Removing the scare factor from the potty training device 20 is just the first step in encouraging the child to use it. The potty training device 20 has a dual reward system incorporated as part of its implementation. First, a clear plastic window 32, shown here on the back side 34 of back member 24, allows the child to see what is stored in compartment 36. Items which may be used to encourage use of the training device 20 include candy, stickers and toys. Key slot 38 permits the trainer to lock and, thereby, control the dispensing of the rewards. Alternatively, a simple thumb screw (not shown) could be used to open and close the latch 40 on window 32 providing access to the rewards.

A second element of the reward system includes a trophy 42. The star 44 shown on the trophy denotes graphics which may include a drawing of a boy on one side and of a girl on the other or could incorporate a picture of the toddler herself/himself. In addition, words like "Congratulations, you did it! You're a big boy/girl!" could appear on the faces of the trophy 42. Trophy 42 has a base 46 with a strip of Velcro® fabric (not shown) on the bottom and a mating strip of Velcro® fabric 48 on the top 25 of back member 24. Trophy 42 may have a hole 50 in its top portion which will permit it to be hung on hook 52 when it is stored and the base 46 attached to top 25 when the child has successfully used the training device 20. It will be understood other techniques of storing and displaying the trophy 42 are also possible including hinging it to the back edge and simply folding it up from its stored position or, the trophy 42 could be mounted to slide in slots from a stored position inside the back member 24. By displaying trophy 42, the care-giving parent can allow the child the opportunity to brag about her/his success to siblings, guests, or the other parent returning from work. The praise offered by his parents and brothers and sisters can go a long way toward encouraging the child to complete the training.

FIG. 4 shows several components of the potty training device 20. Removable collector 54 fits within stool 22 and seat 56 is inserted in stool 22 to overlie the collector 54. Collector 54 is easily removed for emptying and cleaning, readying it for reuse. A splash guard 58 (FIG. 1) helps ensure that possibly wayward streams find their way into collector 54 and not over its edge into stool 22.

The potty training device 20 of the present invention comprises a miniature toilet whose purpose will be readily apparent to a toddler. In addition, the appearance of the unit including decals 28 (and others) will attract the toddler and help remove the scare factor to its use, as will the flush handle 26. Once the child has spent time with the device 20 and assured herself/himself that no demons are lurking in or around it, the promise of rewards including double recognition through the display of trophy 52 and the presentation of prizes such as candy, stickers or toys, will stimulate the child's desire to use the device and accelerate the completion of potty training.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. A device for assisting in potty training a toddler comprising:
   a) a self-standing stool having a seat portion, a collection receptacle, and an openable and closeable lid for covering said receptacle;
   b) a generally rectangular back member attached to said stool said generally rectangular back member resembling a toilet tank, said back member having significant depth and being at least partially hollow for allowing items which encourage usage to be positioned therein, said stool and back member being designed to resemble a miniature full-sized toilet;
   c) means for attracting the toddler to said device to increase familiarity and develop the toddler's desire to use said device and thereby become potty trained.

2. The device of claim 1 wherein said means for attracting the toddler comprises a sound unit actuated by a pivotable handle which produces a simulated sound of a flushing toilet.

3. The device of claim 1 wherein said means for attracting the toddler comprises a reward system for acknowledging the toddler's achievement of successfully using said device.

4. The device of claim 3 wherein said reward system comprises a compartment for storing rewards the toddler will receive to acknowledge her/his achievement said compartment being formed in said at least partially hollow back member.

5. The device of claim 4 wherein said compartment comprises at least one wall made of clear plastic to enable the toddler to see said rewards.

6. The device of claim 4 further comprising a door which may be latched on said compartment to enable said rewards to be dispensed at a proper time.

7. The device of claim 4 further comprising a door which may be locked on said compartment to enable said rewards to be dispensed at a proper time.

8. The device of claim 3 wherein said reward system comprises a displayable trophy, a first attachment means secured to a non-visible portion of said device to permit said trophy to be stored, a second attachment means for permitting said trophy to be displayed on a highly visible portion of said device.

9. The device of claim 8 wherein said highly visible portion of said device comprises a top surface of said back member.

10. The device of claim 1 wherein said means for attracting the toddler comprises a child-friendly appearance including eye-catching display devices.

11. The device of claim 10 wherein said eye-catching display devices comprise decals affixed to portions of said device.

12. The device of claim 11 wherein said decals comprise at least one such decal affixed beneath said closeable and openable lid inducing the toddler to open said lid to further familiarize the toddler with said device and reduce/eliminate any fear about what lies within said self-standing stool.

13. The device of claim 11 further comprising said generally rectangular back member being made of see-through plastic, said eye-catching display devices comprising items suspending within said back member.

14. The device of claim 1 wherein said collection receptacle comprises a removable collector portion which can be easily emptied and washed.

15. A device for assisting in potty training a toddler comprising:
   a) a self-standing stool having a seat portion, a collection receptacle, and an openable and closeable lid for covering said receptacle;
   b) a generally rectangular back member attached to said stool, said stool and back portion generally resembling a miniature full-sized toilet;
   c) means for attracting the toddler to said device to increase familiarity and develop the toddler's desire to use said device and thereby become potty trained, said means for attracting the toddler comprising a sound unit actuated by a pivotable handle which produces a simulated sound of a flushing toilet.

16. A device for assisting in potty training a toddler comprising:
   a) a self-standing stool having a seat portion, a collection receptacle, and an openable and closeable lid for covering said receptacle;
   b) a generally rectangular back member attached to said stool, said stool and back portion generally resembling a miniature full-sized toilet;
   c) means for attracting the toddler to said device to increase familiarity and develop the toddler's desire to use said device and thereby become potty trained, said means comprising a reward system for acknowledging the toddler's achievement of successfully using said device including a displayable trophy, a first attachment means secured to a non-visible portion of said device to permit said trophy to be stored, a second attachment means for permitting said trophy to be displayed on a highly visible portion of said device.

17. The device of claim 16 wherein said means for attracting the toddler comprises a sound unit actuated by a pivotable handle which produces a simulated sound of a flushing toilet.

18. A device for assisting in potty training a toddler comprising:
   a) a self-standing stool having a seat portion, a collection receptacle, and an openable and closeable lid for covering said receptacle;
   b) a generally rectangular back member attached to said stool, said back member having significant depth and being at least partially hollow for allowing items which encourage usage to be positioned therein and wherein said back member is configured so as to resemble a toilet tank, said stool and back portion resembling a miniature full-sized toilet;
   c) means for attracting the toddler to said device to increase familiarity and develop the toddler's desire to use said device and thereby become potty trained, said means for attracting the toddler comprising at least one decal affixed beneath said closeable and openable lid inducing the toddler to open said lid to further familiarize the toddler with said device and reduce/eliminate any fear about what lies within said self-standing stool.

19. A device for assisting in potty training a toddler comprising:
   a) a self-standing stool having a seat portion, a collection receptacle, and an openable and closeable lid for covering said receptacle;
   b) a generally rectangular back member attached to said stool, said stool and back portion generally resembling a miniature full-sized toilet;
   c) means for attracting the toddler to said device to increase familiarity and develop the toddler's desire to use said device and thereby become potty trained comprising said generally rectangular back member being made of see-through plastic with eye-catching display devices suspended within said back member.

* * * * *